July 25, 1933.
W. F. MacGREGOR ET AL
1,919,897
BALING MACHINERY
Filed April 23, 1932    2 Sheets-Sheet 1
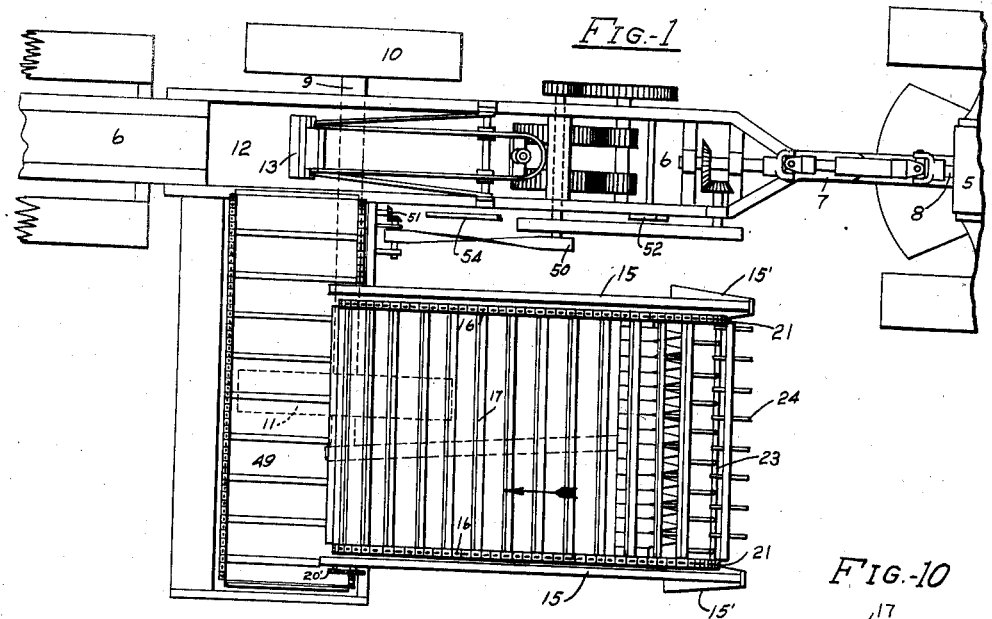
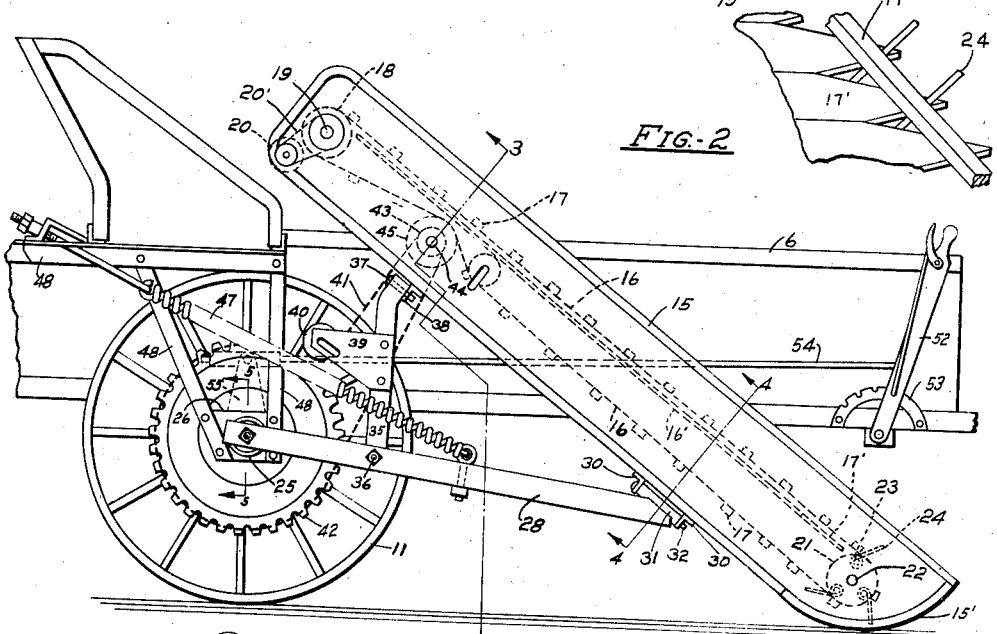
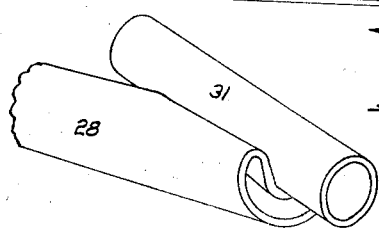
INVENTORS.
WALLACE F. MacGREGOR
MARTIN A. RICHARDSON
BY James A. Walsh
ATTORNEY

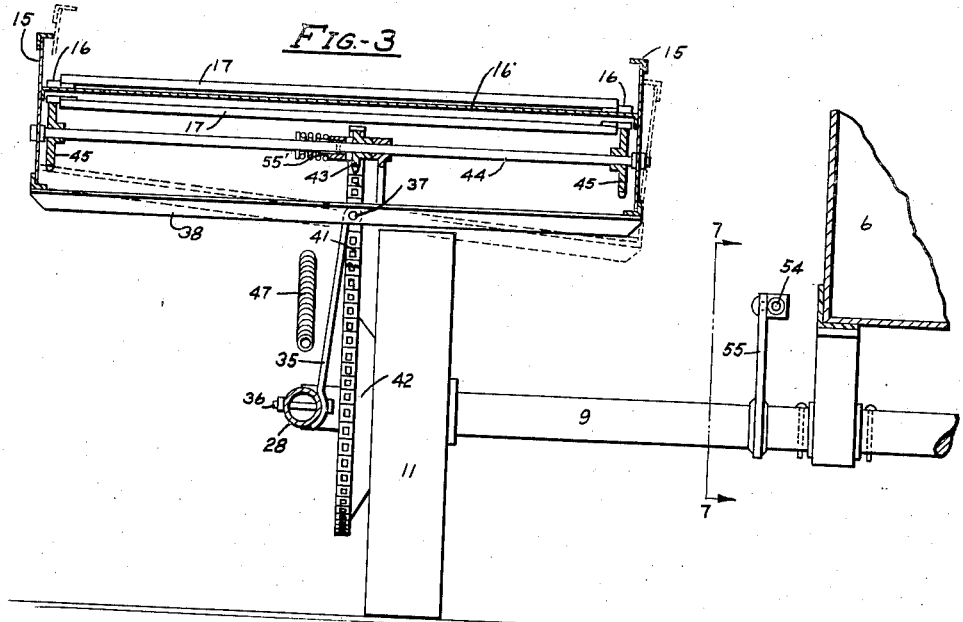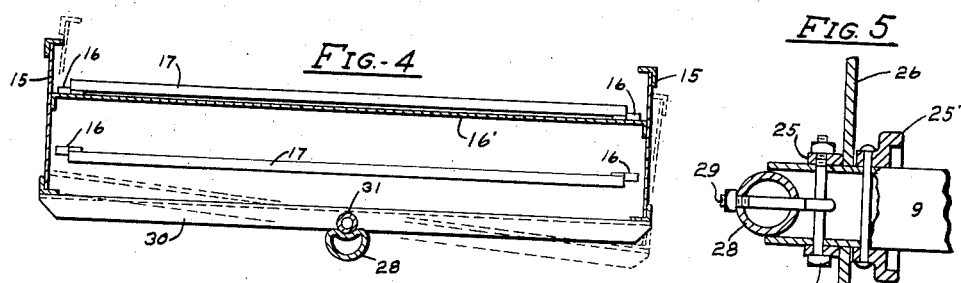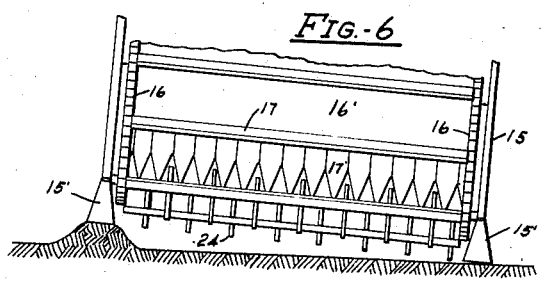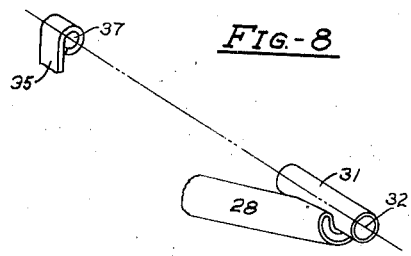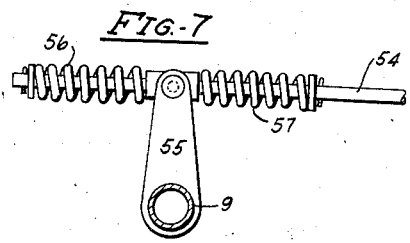

Patented July 25, 1933

1,919,897

UNITED STATES PATENT OFFICE

WALLACE F. MacGREGOR AND MARTIN A. RICHARDSON, OF RACINE, WISCONSIN, ASSIGNOR TO J. I. CASE COMPANY, OF RACINE, WISCONSIN, A CORPORATION

BALING MACHINERY

Application filed April 23, 1932. Serial No. 607,024.

Our invention relates to baling machinery of the character adapted to be drawn through the fields by a tractor for picking up cut alfalfa and other crops and elevating the same to a conveyer or otherwise to be delivered to a complementary baler, our object being to provide a flexibly mounted pick-up which will be self-adjusting to follow ground inequalities encountered in field operations, and the conveying mechanisms thereof preferably actuated from a ground wheel, or otherwise, as will hereinafter more fully appear.

In the accompanying drawings, forming part hereof, Figure 1 is a plan view of a combination baler and pick-up; Fig. 2, a side elevation thereof; Fig. 3, a section taken on the dotted line 3—3 in Fig. 2; Fig. 4, a detail section taken on the dotted line 4—4 in Fig. 2; Fig. 5, a detail section on the line 5—5 in Fig. 2; Fig. 6, a fragmentary front view of the lower end of the pick-up; Fig. 7, a detail section taken on the dotted line 7—7 in Fig. 3; Fig. 8, a perspective showing the coincident pivotal relation of the pick-up bearing and supporting points hereinafter referred to; Fig. 9, a perspective of the lower end of a push-rod employed and a bearing mounted thereon; and Fig. 10 is a fragmentary perspective of the lower portion of the pick-up.

In said drawings the numeral 5 indicates a tractor, 6 a baler connected thereto by a drawbar 7 or otherwise, and the mechanisms of which baler are actuated by a power take-off shaft 8 forming part of a tractor, all in a well known manner, but it will be understood that the baler may be operated by other means.

The baler is in part secured to and supported by a rocking axle 9 carried by the wheels 10, 11, the latter wheel 11 being extended in relation to the baler for supporting the pick-up, the baler, as is common, comprising a suitable body embodying a baling chamber 12 in which material is inserted by a feeder-head 13 of any desired construction and compressed by a plunger (not shown).

The pick-up comprises a body 15 having shoes 15' in which body is mounted a carrier formed of chains 16 connected by cross-slats 17 and which chains travel about a floor 16' having a series of points 17' at its lower end, thence over upper sprockets 18 mounted on shaft 19, and also over the lower sprockets 21 mounted on shaft 22, said sprockets 21 carrying shafts 23 upon which tines or fingers 24 are supported to revolve with the sprockets. The arrangement and movements of the carrier and fingers 24 are so timed that said fingers revolve against the traveling cross slats 17 as they are moving across the converged space between the points 17' so that in effect the edges of the points and the cross-slats provide a three-way stripping means for the fingers 24 whereby they may be prevented from wrapping the hay around the pick-up shafts 23. At the upper end of the carrier we mount a roller 20 driven by a chain, as 20', for a purpose to appear.

Upon axle 9, which is in the form of a pipe, we provide a collar 25 mounted adjacent a gusset 26, which is held in fixed position by a collar 25', and which collar 25 is secured to the axle 9 by a bolt 27, the axle being cut away at its end for the reception of a tubular push-rod 28 which is tightly fitted thereinto and secured by an eye-bolt 29 as shown in Fig. 5, said push-rod extending forwardly for sustaining the pick-up, which latter is pivotally secured to the forward end of the rod by ears, or angle-bars, 30, and the tubular bearing 31 through which a pin 32 is secured, as indicated in Fig. 2, said bearing being preferably welded to the rod as shown in Fig. 9. Said rod 28, as clearly shown in Fig. 3, is positioned adjacent the wheel 11 so that it occupies a position medianly of the pick-up. Upon the push-rod we mount a post or standard 35, preferably bolted thereto, as at 36, and its upper end is so formed or provided as to be pivotally connected by a pin 37 to a cross-member 38 of the carrier frame, which pivotal connection coincides with the lower pivotal connection 32 so that the pick-up may rock from side to side as indicated by the dotted lines in Figs. 3 and 4. The post 35, or equivalent supporting means associated with push-rod 28, carries a bracket 39 which supports a tightener 40 for controlling a chain 41 connecting a sprocket 42 on wheel 11 to a sprocket 43 in the pick-up, which sprocket is mounted on shaft 44 having sprockets 45 at its ends, Fig. 3, engaging the respective chains 16 for driving the carrier in the direction indicated by the arrow in Fig. 1. We may also employ an adjustable counterbalancing spring 47 connecting the push-rod 28 to a frame part 48 of the machine for maintaining the rod and associated parts in balanced position. Upon the frame 48, a portion of which is secured to the gusset 26, we mount a conveyor 49 of any desired construction for delivering to the chamber 12 the material which discharges from the pick-up, and which conveyer may be actuated by a driving system, as 50—51, associated with the baler.

Vertical adjustment of the pick-up is accomplished through a lever and quadrant 52—53, Fig. 2, of well known form, to which a rod 54 is secured, and at its opposite end is slidably attached to an arm 55 secured to the axle 9, springs 56, 57, being retained on said rod at opposite sides of the arm 55. When the rod 54 is adjusted longitudinally, it will be understood that the same is locked in position by the lever and quadrant, but when there is a tendency for the axle 9 to rock such action is permitted to a limited extent by the yielding springs 56, 57, so that in such rocking motion the arm 55 will slide along said rod 54.

In operation, it will be understood that it is important during the travel of the pick-up to so maintain the same that it will readily pass over ground irregularities, and this in the main is accomplished by positioning the push-rod 28 so that its forward end will be connected adjacent the lower end of the pick-up whereby, when the latter encounters an obstruction as indicated in Fig. 6, the rod will exert a floating action on the pick-up to assist it over hills and to follow depressions and the like, and by the pivotal connections 32, 37, the pick-up will be free to shift or rock from side to side to be accommodated to undulations and thus traverse the ground without danger of stalling or digging thereinto, which otherwise may occur if pushing force is applied at an appreciably higher point. Therefore, in gathering and baling alfalfa and other windrowed crops it will be understood that the combined baler and pick-up moves through the field in the path of the material, which is thrown by the tines 24 onto the pick-up carrier and carried thereby upwardly to be discharged onto the conveyer 49 by which latter it is delivered to the baling chamber 12, and that should loose straws or stalks pass directly downwardly instead of out onto the conveyer 49 such surplus material will be intercepted by the roller 20 and properly directed out of the pick-up carrier with the remainder of the material, and while so moving and operating any jerky or bumpy actions to which the pick-up may be subjected will be absorbed by the spring 47 and the yielding movement of the arm 55 controlled by the springs 56 and 57 as explained. In practice we have demonstrated that a combination machine of the character disclosed is highly efficient in gathering and baling crops, and while we have specifically described the operability of the pick-up and conveyor attachment in field work it is to be understood that in leaving a field or otherwise the pick-up tines and carrier should be rendered functionless, and this may be accomplished in a simple manner, for example, by a clutch 55' on shaft 44, Fig. 3, which, when declutched, renders said parts inoperative, so that the machinery including the baler and pick-up may be transported as a unit in idle condition and readily readjusted for renewing field operation as desired. It will be also explained that the forward end of the pick-up may be raised clear from the ground by manipulating the lever 52, and that by discontinuing rotation of the power shaft 8 the actuation of the baler mechanisms and the conveyer 49 will cease. In pivoting the carrier medially on rod 28 and a suitable support, as post 35, and supporting the rod on the rocking axle 9, a flexible mounting is provided whereby the traveling pick-up is of a floating character and will instantly respond to ground irregularities by raising and lowering at its forward end, and also rock laterally where conditions require, so that in meeting obstacles no maneuvering of the pick-up is required as it freely automatically follows and surmounts such conditions, said pick-up as indicated being free to rock vertically or laterally, or simultaneously in both directions.

We claim as our invention:

1. In a pick-up for balers, means pivotally connected to the pick-up for supporting it and whereby it may be adjusted vertically, and other means for supporting the pick-up and pivotally connected thereto, the pivotal mountings of said connecting means and said supporting means being coincident whereby the pick-up may be adjusted laterally.

2. In a pick-up including a carrier, means pivotally connected to the pick-up for supporting the same and whereby it may be adjusted vertically, other means for supporting the pick-up and pivotally connected thereto, the pivotal connections of said connecting and supporting means being coincident whereby said pick-up may be adjusted laterally, and means for actuating the carrier to draw material thereon and convey the same to a source of deposit.

3. In a pick-up, means pivotally connected thereto for supporting and vertically adjusting it, and other means supporting the pick-up and pivotally connected thereto, the pivotal connections of said connecting and supporting means being positioned in coincident relation and medianly of the pick-up whereby the latter may rock in lateral directions.

4. In a pick-up including a carrier, pushing means pivotally connected to the pick-up, rocking means for supporting the opposite end of the pushing means whereby the pick-up may be adjusted vertically, supporting means associated with the pushing means and pivotally connected to the pick-up in coincident relation with the pivotal connection of the pushing means whereby the pick-up may rock laterally, means for actuating the carrier to convey material therefrom as the pick-up gathers material in field operations, and means for rendering the carrier functionless when not gathering material.

5. The combination, with a baler, of a conveyer, means for actuating the conveyer, an axle supporting the conveyer, a wheel on the axle including driving means, a pick-up including a carrier, means connecting the axle and pick-up, means connecting said latter means to the pick-up, and means associated with the carrier and connected to the wheel driving means for actuating the carrier to elevate material and discharge the same into said conveyer and delivered thereby to said baler.

6. The combination, with a baler having an axle, a driving wheel on the axle, a pick-up including a carrier, means connecting the axle and pivotally connecting the pick-up whereby the latter may be adjusted vertically, and means connecting said first mentioned means and pivotally connected to the pick-up whereby the latter may rock laterally.

7. The combination, with a baler having an axle, of a pick-up mounted on the axle, means connected to the baler and to the axle for rocking the latter to vertically adjust the pick-up, and means associated with the pick-up for counterbalancing the same while being adjusted.

8. The combination, with a baler having an axle, a wheel on the axle, pushing means connected to the axle, a pick-up embodying a carrier mounted on the pushing means, means for actuating the carrier, means for vertically adjusting the pick-up, and means for receiving and conveying material from the carrier.

9. The combination, with a baler, of a pick-up embodying a carrier, means for rockingly connecting said elements, means for actuating the carrier, means whereby the pick-up may rock laterally, means for counterbalancing the pick-up, and means for rendering the carrier functionless when not gathering material.

10. In a vertically and laterally adjustable pick-up, supporting means therefor, means pivotally connecting the pick-up to the supporting means, means connecting the supporting means whereby the pick-up may be vertically adjusted, and means associated with said connecting means for vertically adjusting the pick-up.

11. In a pick-up having an axle, a supporting and driving wheel on the axle, a conveyer supported by the axle, means associated with the pick-up for delivering material to the conveyer, means connecting the axle and pick-up for supporting the latter, means connected to the axle for actuating the same to vertically adjust the pick-up, and means connecting the wheel and pick-up for actuating the delivering means thereof to discharge material into said conveyer.

12. In a pick-up, an axle, a support on the axle, a conveyer mounted on the support, pushing means connected to the axle and extending forwardly therefrom, means in the pick-up for delivering material to the conveyer, means for actuating the delivering means to discharge material into the conveyer, a spring-mounted rod connected to the axle, a lever connected to the rod for actuating the axle to adjust the pick-up, and a clutch associated with the carrier for starting and stopping the actuation thereof.

13. In a pick-up, an axle, a frame supported on the axle, pushing means connected to the axle, means for pivotally connecting the pick-up to the pushing means, means associated with the pick-up for conveying material, means for actuating said conveying means, and means connecting the pushing means and the frame for counter-balancing the pick-up.

14. In a pick-up of the character described, means for supporting the same whereby it may rock laterally; means connecting the supporting means whereby it may be adjusted vertically; a carrier forming part of the pick-up having a floor embodying a plurality of points, an endless conveyer in the carrier having cross-slats, and fingers forming part of the conveyer adapted to be revolved through the converging spaces between the points and against said slats whereby said fingers are stripped of material; and means for actuating the conveyer.

15. In a pick-up of the character described, a carrier having a floor including projecting points at its lower end, fingers supported in the carrier and adapted to be revolved, an endless conveyer adapted to travel about the floor, said conveyer having cross-members, and means for actuating the conveyer whereby the fingers will pass between said points and members and be stripped of material.

16. In a pick-up, an axle supporting the same, an arm on the axle, a rod slidably connected to the arm, a support on the axle, a pick-up on the support, means for actuating said arm to rock the axle whereby the support will vertically adjust the pick-up, and means connecting the support and pick-up whereby the latter may rock laterally when traversing ground irregularities.

17. In a pick-up, an axle, a support connected to the axle and extending at right angles therefrom, means connecting the support and pick-up whereby the latter may rock laterally, means for actuating the axle to vertically adjust the pick-up and means associated with the support for balancing the pick-up.

18. Baling machinery comprising a baler, a support mounted on the baler, a pick-up connected to said support, means on the baler and connected to the support for actuating the latter to vertically adjust the pick-up, and means pivotally securing the pick-up to the connecting means whereby the pick-up may rock laterally.

19. In baling machinery, the combination, with a baler, of a pick-up including a traveling carrier, means for floatingly sustaining the pick-up whereby the latter may be vertically adjusted, means for pivotally connecting the latter means whereby the pick-up may rock laterally, means for actuating the carrier, and means for stopping movement of the carrier.

WALLACE F. MacGREGOR.
MARTIN A. RICHARDSON.